Patented Mar. 18, 1924.

1,487,133

UNITED STATES PATENT OFFICE.

HARRY H. ALEXANDER, OF WESTFIELD, NEW JERSEY, ASSIGNOR TO AMERICAN SMELTING AND REFINING COMPANY, OF NEW YORK, N. Y., A CORPORATION OF NEW JERSEY.

PROCESS OF FORMING IRON-TIN ALLOY.

No Drawing.   Application filed October 25, 1920.   Serial No. 419,474.

*To all whom it may concern:*

Be it known that I, HARRY H. ALEXANDER, a citizen of the United States, and resident of Westfield, in the county of Union and State of New Jersey, have invented certain new and useful Improvements in Processes of Forming Iron-Tin Alloy, of which the following is a specification.

The invention relates in general to a process of forming a tin-iron alloy as an incident in the recovery of metallic tin in the metallurgical art of extracting tin from its ores and other tin-bearing material and the invention relates specifically to the formation of a tin-iron alloy from tin slag.

In the smelting of tin concentrates which usually contain silica, iron, tin and sulphur, there is produced for each ton of concentrates treated about one-half ton of slag frequently containing 10–15% of tin or more.

The formation of tin iron alloy has heretofore been regarded as objectionable in the art of recovering tin from its ores and every effort has been made to prevent its formation. On the contrary this disclosure features the production of this alloy from the slag resulting from the smelting of the tin ore or concentrates.

One of the objects of the invention is to provide a simple process for forming economically a tin-iron alloy from tin slag and insuring the recovery of practically all of the tin from the slag. Various other objects of the invention will be more fully set forth in the accompanying specification and pointed out in the accompanying claims.

The process consists in treating stanniferous slags in a blast furnace so as to collect practically all of the tin found in the slag by causing the same to form an alloy or compound with the iron.

In carrying out this process the stanniferous slag, which frequently contains considerable percentages of tin in the form of oxides or silicates, together with compounds of iron, such as silicates of iron, forms one part of the charge to the furnace. The slag may also contain small quantities of other metals.

Preferably the slag is granulated and sintered before it is fed to the furnace, but this step is not essential to the formation of the alloy, since the slag can be broken into lumps and charged directly to the furnace although the sintering usually results in the recovery of a larger percentage of the tin. In case the slag is to be sintered, it is mixed with a suitable flux, such as limestone, and treated upon any well known apparatus, such, for example, as the Dwight and Lloyd sintering machine.

The charge to the blast furnace consists of the broken or sintered slag, together with a reducing fuel and a suitable flux. Unless the slag is relatively high in iron, additional iron is introduced into the charge in some form, preferably as ferruginous tin ore. It is desirable to produce a liquid slag according to this process, and in case the slag fed to the furnace as a part of the charge should be deficient in silica, then silica or a silicious material may be added. The fuel is preferably in the form of coke, and is mixed with the slag and the flux prior to being charged to the blast furnace, although an intimate mixture is not necessary. Precautions are taken to prevent the formation of metallic tin, the object being to free the tin and the iron from their compounds and permit the same to re-combine as an iron tin alloy.

The blast furnace may be of the conventional water jacketed type, and the iron tin alloy is tapped from the furnace in the usual manner, the smelting taking place under the usual conditions of blast furnace smelting.

The resulting slag contains a relatively small amount of tin, usually less than three per cent, which may receive further treatment in a slag settling furnace. Some metallic tin may be produced by this process, but practically all of the tin combines with the iron to form an alloy. The alloy may subsequently be treated in any approved method to separate the tin from the iron.

Having thus described my invention, I claim:—

1. In the art of preparing a charge of material for use in a blast furnace in the formation of a tin-iron alloy, the process which consists in mixing tin slag with limestone, sintering the mixture, and mixing the sintered mixture with a carbonaceous fuel and with a flux.

2. In the art of preparing a charge of material for use in a blast furnace in the formation of a tin-iron alloy, the process which consists in mixing tin slag with limestone, sintering the mixture and mixing the sintered mixture with coke and limestone.

3. In the art of preparing a charge of material for use in a blast furnace in the formation of a tin-iron alloy, the process which consists in mixing tin slag with limestone, sintering the mixture and mixing the sintered mixture with a carbonaceous fuel and with limestone.

4. In the art of preparing a charge of material for use in a blast furnace in the formation of a tin-iron alloy, the process which consists in mixing tin slag with limestone, sintering the mixture and mixing the sintered mixture with a carbonaceous fuel, and a flux.

5. In the art of producing an alloy of tin and iron, the process which consists in granulating tin slag, mixing the same with finely ground limestone, sintering the mixture, mixing the sinter with a fuel and a flux and smelting the sinter containing mixture.

6. In the art of producing tin iron alloy from slag containing compounds of tin and iron, the process which consists in subjecting the crushed slag to the action of a blast furnace together with sufficient flux to produce a liquid slag and with reducing material sufficient to reduce the compounds of tin and iron and permit the tin and the iron to re-combine without further reduction of the tin.

7. In the art of producing tin iron alloy from slag containing compounds of tin and iron, the process which consists in mixing the crushed slag with reducing agents and fluxes in quantity sufficient to release the tin and the iron from their compounds and permit the same to re-combine as a tin iron alloy, subjecting the mixture to the action of a blast furnace without producing substantial amounts of metallic tin, and separating the alloy from the slag.

8. The process which consists in mixing granulated tin slag with finely ground limestone, sintering the mixture, mixing the sintered product with fuel and fluxes and smelting the mixture.

Signed at New York city, in the county of New York and State of New York, this 13th day of October, A. D. 1920.

HARRY H. ALEXANDER.